United States Patent

Voegler

[11] Patent Number: 5,805,286
[45] Date of Patent: Sep. 8, 1998

[54] PROCESS FOR DETERMINATION OF THE POSITION OF A VEHICLE IN A PLANE OF TRAVEL

[75] Inventor: Herbert Voegler, Herdecke, Germany

[73] Assignee: Fraunhofer-Gesellschaft zur Forderung der angewandten Forschung e.V., Munich, Germany

[21] Appl. No.: 744,924

[22] Filed: Nov. 6, 1996

[30] Foreign Application Priority Data

Nov. 7, 1995 [DE] Germany .................. 195 41 379.2

[51] Int. Cl.$^6$ ................................... G01B 11/14
[52] U.S. Cl. ................ 356/375; 356/373; 356/383; 356/386
[58] Field of Search ................ 356/375, 373, 356/383, 386

[56] References Cited

U.S. PATENT DOCUMENTS

| | | | |
|---|---|---|---|
| 4,225,226 | 9/1980 | Davidson | 316/3.01 |
| 4,647,784 | 3/1987 | Stephens | 250/561 |
| 4,811,228 | 3/1989 | Hyyppa | 364/424 |

FOREIGN PATENT DOCUMENTS

| | | |
|---|---|---|
| 0363072 | 4/1990 | European Pat. Off. . |
| 238615 | 7/1991 | European Pat. Off. . |
| 3725896 | 2/1989 | Germany . |
| 3930109 | 11/1990 | Germany . |
| WO8701814 | 3/1987 | WIPO . |
| WO8702484 | 4/1987 | WIPO . |
| WO9002987 | 3/1990 | WIPO . |

OTHER PUBLICATIONS

"Free Range A.G.V. Uses Laser Guidance", P. Stephens, et al, Jul. 1983, *The FMS Magazine*, pp. 232–236.

*Primary Examiner*—David C. Nelms
*Assistant Examiner*—Reginald A. Ratliff
*Attorney, Agent, or Firm*—Weingarten, Schurgin, Gagnebin & Hayes LLP

[57] ABSTRACT

Described is a process for determination of the position of a vehicle in a plane of travel by means of a laser beam transmitted by a sensor, mounted on the vehicle, parallel to the plane of travel and scanning approximately 360°. The reflection from at least two fixed reference points is processed by a receiver and a computer. The reference points are formed by a limited number of distinguishable marks and the marks identified by the fact that their width and the beam angle are determined and, from them, the distance between the sensor and the mark is computed. The variance of the vehicle position is computed from the known variance of the bearing angle and the position of the measured mark relative to the sensor and utilized for the correction of the estimated position of the vehicle.

3 Claims, 1 Drawing Sheet

PROCESS FOR DETERMINATION OF THE POSITION OF A VEHICLE IN A PLANE OF TRAVEL

BRIEF SUMMARY OF THE INVENTION

The invention concerns a process for the determination of the position of a vehicle in a plane of travel by means of a laser beam transmitted by a sensor, mounted on the vehicle, parallel to the plane of travel and scanning approximately 360°.

BACKGROUND OF THE INVENTION

A method for steering a vehicle is known from EP 0,238,615, in which a laser beam scanning a 360° space horizontally is received and evaluated after reflection from a number of fixed points arranged in the space, at least three angles being required for a trigonometric determination of the vehicle position. Utilized as fixed points are anonymous marks, whose position as well as the position of impediments to line of sight are known. The identification of the marks takes place with the help of the last position determined and of the information stored in the memory of the vehicle on the impediments to line of sight between the stationary marks and direction of orientation relative to the vehicle. A computation of the vehicle position is possible only when at least three marks can be measured and identified.

A direction-finding process for the orientation of automatically guided vehicles in known, moreover, from GB patent document 83/13,339. In this case, a laser beam rotating in a horizontal plane is used for the measurement of the marks. Serving as marks are various arrangements of reflective strips, comparable to a bar code, which permit an unequivocal identification of each mark. The position of the vehicle is computed from at least three bearing angles according to known trigonometric methods.

The purpose of the present invention is to create a method for determination of the position of a vehicle in a plane of travel, which can be carried to practical advantage without great computational overhead, but at the same time permits a precise determination of the position of the vehicle.

This goal is achieved by the process described in claim 1. The subclaims represent advantageous further developments.

BRIEF DESCRIPTION OF THE SEVERAL VIEWS OF THE DRAWING

The principle of the invention is described with the help of FIGS. 1 through 3. Appearing in.

DETAILED DESCRIPTION OF THE INVENTION

The invented process yields positions with very high measurement accuracy. The measurement accuracy of the position can be increased by the arrangement of stationary reflection points and of the sensor itself. The fixed reflection points, i.e. the position marks should be arranged at an adequate distance (for example, $\geq 15°$) from each other. Such an arrangement is sufficient to obtain high position-measurement accuracy.

Figure 1:
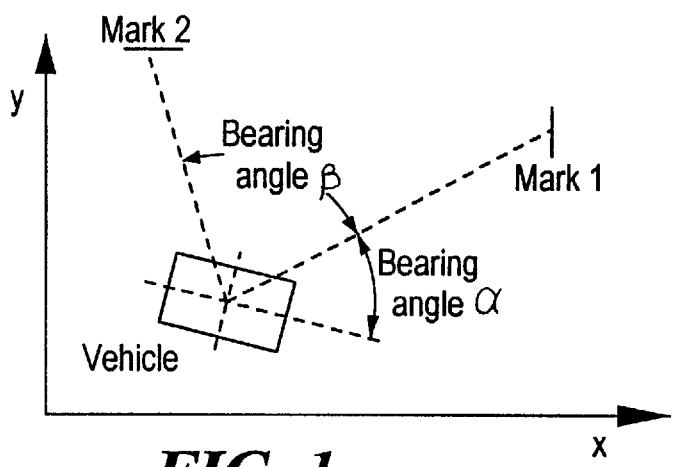
FIG. 1 is a schematic representation of the process arrangement.
Figure 2:
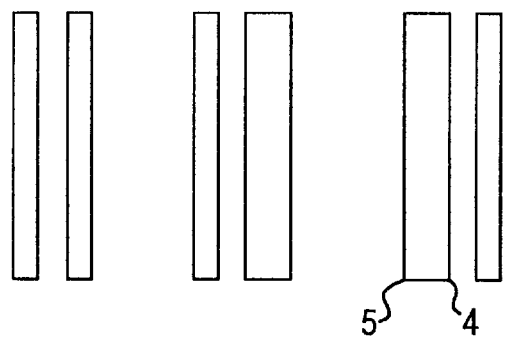
FIG. 2 is a representation of the coded marks.
Figure 3:
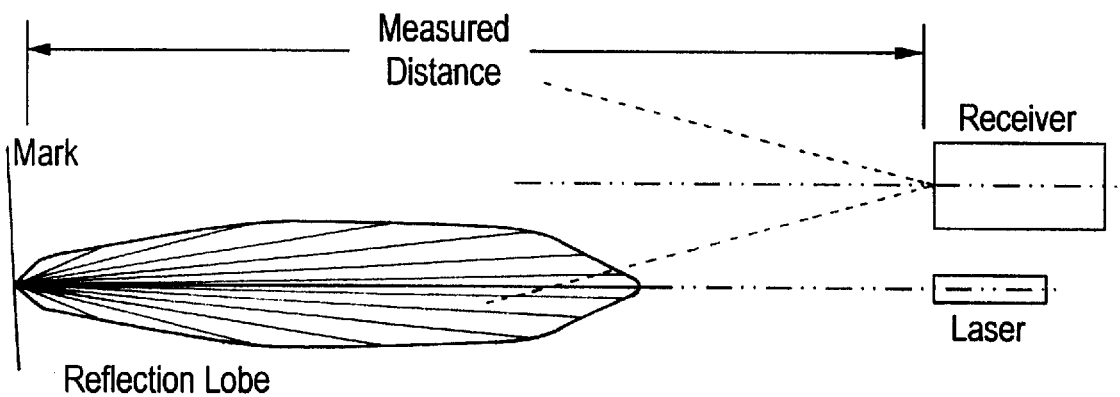
FIG. 3 is a representation of the course of the beam in the process.

The collimated light beam, which is located in the orientation sensor, is aimed at a rotating mirror which is inclined by exactly 45° relative to its axis of rotation, the direction of the beam being precisely parallel to the axis of rotation of the mirror. The light beam is in this way deflected in a plane parallel to the plane of travel. If the light beam strikes a retroreflector 2, 3, it is reflected along the angle of incidence and, via the rotating mirror, likewise reaches a receiver in the vehicle 1, which consists of an interference filter, a lens and a photodiode. By means of an amplifier, bandpass filter and comparator, the signal is prepared in such a way that it can be read and processed by a computer. These techniques are among the techniques known and utilized in the field of vehicle-position determination. The offset arrangement of the light transmitter and receiver takes advantage of the reflected-beam property of the retroreflector 2, 3 in such a way that the fluctuation in the intensity of the reflected light is less by at least the factor of three than would be the case with a coaxial arrangement (compare FIG. 3). A special focus setting is employed as a further measure for the reduction of the intensity fluctuation. This is implemented in such a way that the diameter of the circle of confusion at the maximal measurement distance equals to the diameter of the sensor surface of the photodiode. At smaller measurement distances, the diameter of the circle of confusion is larger than that of the sensor surface, so that a corresponding part of the light quantity does not hit the sensor. The angular measurement of the bearing $\alpha$, $\beta$, etc. takes place through an incremental angle generator. A phase-locked loop circuit can be used to multiply the counter frequency to increase angular resolution. The stationary reflection points, configured as marks, consist of at least two parallel strips of reflective material (FIG. 2), in which case the strips and possibly also the intervals (gaps) between the strips can be of equal or different width. It is thus possible to produce reflection marks exhibiting a number of different markings, which can be reliably distinguished from other reflective objects. Because the ratios of the strip widths of the marks are set precisely beforehand and a partial concealment of the mark would lead to invalid mark coding or invalid width ratios, the process permits a reliable recognition of the partial concealment of a mark. This is a significant advantage of the present process. It is furthermore possible in the process described to distinguish disturbances from extraneous light and random reflections reliably, because the widths of the reflective and nonreflective zones of the mark are precisely set in beforehand. The exact position of the marks in a stationary coordinate system is ordinarily determined with the methods of land surveying and stored in the memory of the vehicle computer. Stored in addition are the mark codes and the direction of the surface normals of the marks. The vehicle computer receives accordingly a series of measurement-angle values $\alpha$, $\beta$, etc., which indicate the beam angle at which the laser beam strikes the beginning or end of the reflector strip 4, 5. A position estimate is assigned to each measurement, which is determined with the aid of dead reckoning. Determined first of all from these measurements is the mark code, the mark width and the bearing angle. The distance between sensor and mark is determined from the measurement of the mark width. The measured distance is compared with the expected distance and permits an identification of the marks even when mark coding and bearing angle do not permit unequivocal identification. The assignment of the measurements to the marks stored in the memory of the vehicle computer takes place in succession for each measurement and each mark according to the following plan:

Computation:

Computed from the estimated position value assigned to the measurement to be tested and the data of the mark to be respectively tested are the beam angle and the anticipated distance to the mark to be tested. The measured distance is determined from the measured mark width and the beam angle.

Testing

1. Comparison of the mark coding.
2. Checking the beam angle for validity.
3. Comparison of the measured and anticipated bearing angle.
4. Checking for double assignment to a mark.

A measured value is then assigned to a mark, when all five test criteria are satisfied. When at least two measurements can be assigned, the correction value as well as the covariance matrix of the correction for the position estimate determined by dead reckoning are computed from them. The position estimate is then corrected in such a way that the corrected value exhibits a minimal variance.

I claim:

1. A process for determining the position of a vehicle in a plane of travel comprising the steps of: reflecting a laser beam transmitted by a sensor with a reflecting element mounted on the vehicle, parallel to the plane of travel and scanning approximately 360°; processing reflections from at least two fixed reference points by a receiver and a computer, the reference points being formed by a limited number of distinguishable marks and the marks identified in such a way that their width is computed from the viewpoint of the sensor from the actual mark measurement, the distance between marks and sensor, and the angle between the laser beam and the surface normals of the mark; computing the variance of the vehicle position from a known variance of the bearing angle and the position of the measured mark relative to the sensor; and correcting the estimated position of the vehicle by utilizing said computed variance.

2. The process according to claim 1, wherein the step of computing the estimated position of the vehicle is determined by dead-reckoning navigation.

3. The process according to claim 1 wherein the transmitted and reflected beams are mutually offset.

* * * * *